(12) United States Patent
Teng et al.

(10) Patent No.: US 7,181,372 B2
(45) Date of Patent: Feb. 20, 2007

(54) DESIGN METHOD USING KNOWLEDGE-BASED OPTIMIZATION

(75) Inventors: Yu Teng, Sterling Heights, MI (US); Leo Paul Gerard Oriet, Rochester Hills, MI (US); Randy Gu, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 412 days.

(21) Appl. No.: 10/793,485

(22) Filed: Mar. 4, 2004

(65) Prior Publication Data

US 2005/0194778 A1    Sep. 8, 2005

(51) Int. Cl.
*G06F 17/50* (2006.01)
(52) U.S. Cl. .................... 703/1; 703/2; 703/8
(58) Field of Classification Search .......... 703/1, 703/8; 29/33 P, 430, 711, 712; 410/24
See application file for complete search history.

(56) References Cited

U.S. PATENT DOCUMENTS 3,854,889 A * 12/1974 Lemelson ............... 29/33 P
4,894,908 A * 1/1990 Haba et al. ............... 29/711
5,239,739 A * 8/1993 Akeel et al. .............. 29/430
5,272,805 A * 12/1993 Akeel et al. .............. 29/712
5,690,453 A * 11/1997 Claps ..................... 410/24

OTHER PUBLICATIONS

Williams et al., E.J. Analysis of Conveyor Systems Within Automotive Final Assembly, IEEE Simulation Conference, vol. 2, Dec. 1998, pp. 915-920.*
Sly, D.P. Research to Application Success Stories: Manufacturing, Proceedings of the 29th Conference on Winter Simulation, ACM Press, Dec. 1997, pp. 1286-1292.*
Mecklenburg, K. Seemless Integration of Layout and Simulation, Proceedings of the 33rd Conference on Winter Simulation, IEEE, Dec. 2001, pp. 1487-1491.*

* cited by examiner

*Primary Examiner*—Russell Frejd
(74) *Attorney, Agent, or Firm*—Ralph E. Smith

(57) ABSTRACT

A system for designing vehicle chassis carriers comprises a user interface that receives vehicle parameter data. The user interface may be implemented using a spreadsheet or other data entry application as are known in the art. A user enters the vehicle parameter data such as vehicle dimensions and geometry. A design program such as a CAD program receives the vehicle parameter data and generates a vehicle chassis carrier design according to the vehicle parameter data and design constraints. The design constraints include weights, structural strength, and clearance information with respect to the carrier, the vehicle chassis, and obstructions in the environment.

15 Claims, 3 Drawing Sheets

DESIGN METHOD USING KNOWLEDGE-BASED OPTIMIZATION

FIELD OF THE INVENTION

The present invention relates to automotive carriers, and more particularly to the automated design of automotive carriers.

BACKGROUND OF THE INVENTION

Vehicle chassis carriers are used to transport vehicle chassis during production in an automotive factory. Typically, the design and manufacture of vehicle chassis carriers is expensive due to the wide range of vehicles that the carriers must support. For example, the vehicle chassis carriers tend to be larger and heavier than necessary. Referring now to FIG. 1, an exemplary two-post carrier 10 includes first and second bent posts 12 and 14. First ends of the bent posts 12 and 14 are connected to load-bearing lower bars 16 and 18. Second ends of the bent posts 12 and 14 are connect to an upper bar 20. The lower bars 16 and 18 support a vehicle chassis. The upper bar 20 connects the two-post carrier 10 to a conveyer system for transporting the two-post carrier 10 and the vehicle chassis.

Referring now to FIG. 2, an exemplary four-post carrier 30 includes four bent posts 32, 34, 36, and 38. First ends of the bent posts 32, 34, 36, and 38 are connected to load-bearing lower bars 40, 42, 44, and 46. Second ends of the bent posts 32, 34, 36, and 38 are connected to an upper bar 48. The lower bars 40, 42, 44, and 46 support a vehicle chassis. The upper bar 48 connects the four-post carrier 30 to the conveyer system.

SUMMARY OF THE INVENTION

A system for designing vehicle chassis carriers comprises a user interface that receives vehicle parameter data. A database includes chassis carrier design data, vehicle design data, and design constraints. A chassis carrier design program communicates with the user interface and the database and generates a chassis carrier design according to the vehicle parameter data, the chassis carrier design data, the vehicle design data, and the design constraints.

In another aspect of the invention, a method for generating a design for a vehicle chassis comprises defining process constraints for the vehicle chassis carrier. Vehicle parameter data is received. A chassis carrier design is generated according to the vehicle parameter data and the process constraints.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figures 1, 2:
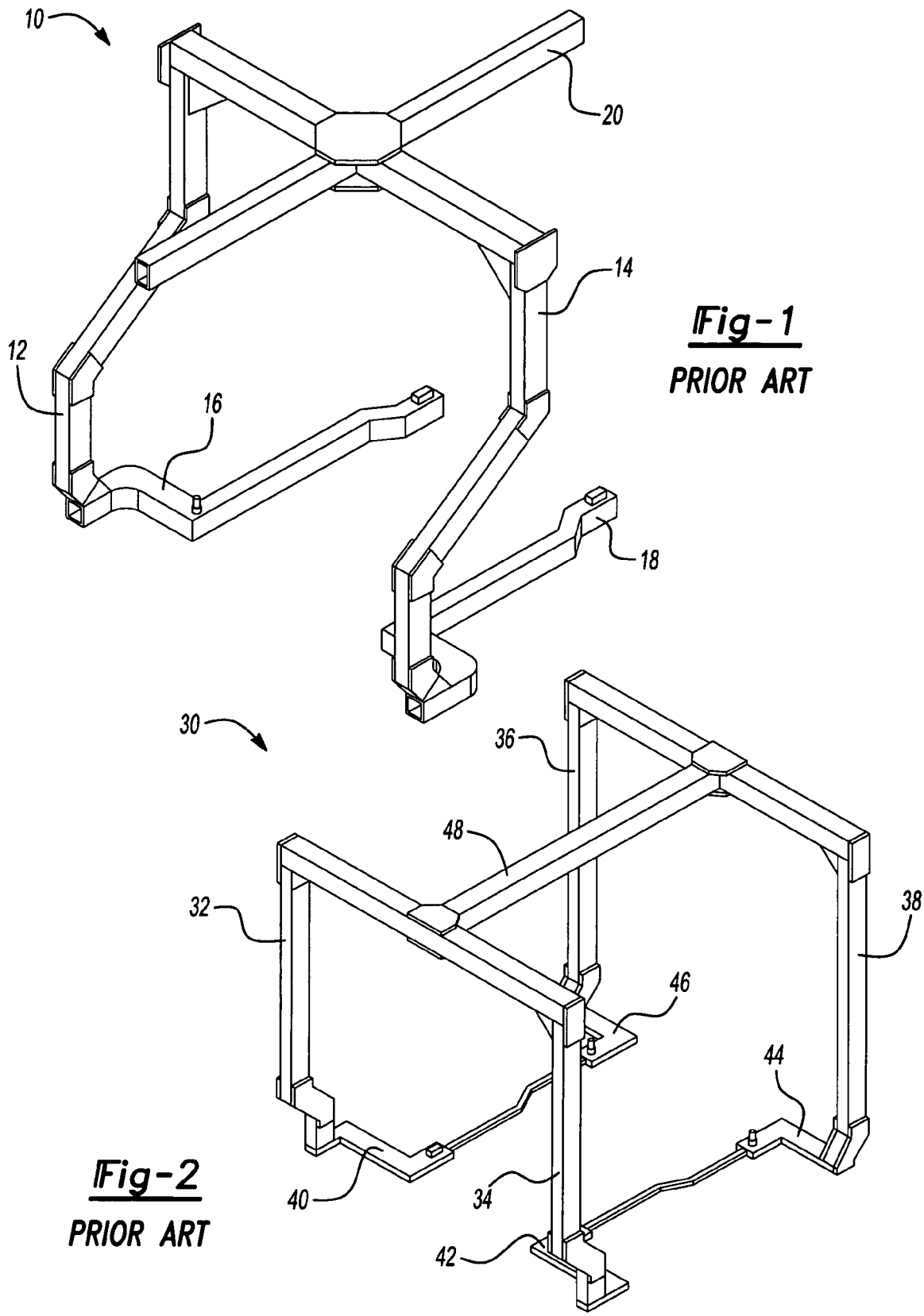
FIG. 1 is an exemplary two-post carrier according to the prior art.
FIG. 2 is an exemplary four-post carrier according to the prior art.
Figure 3:
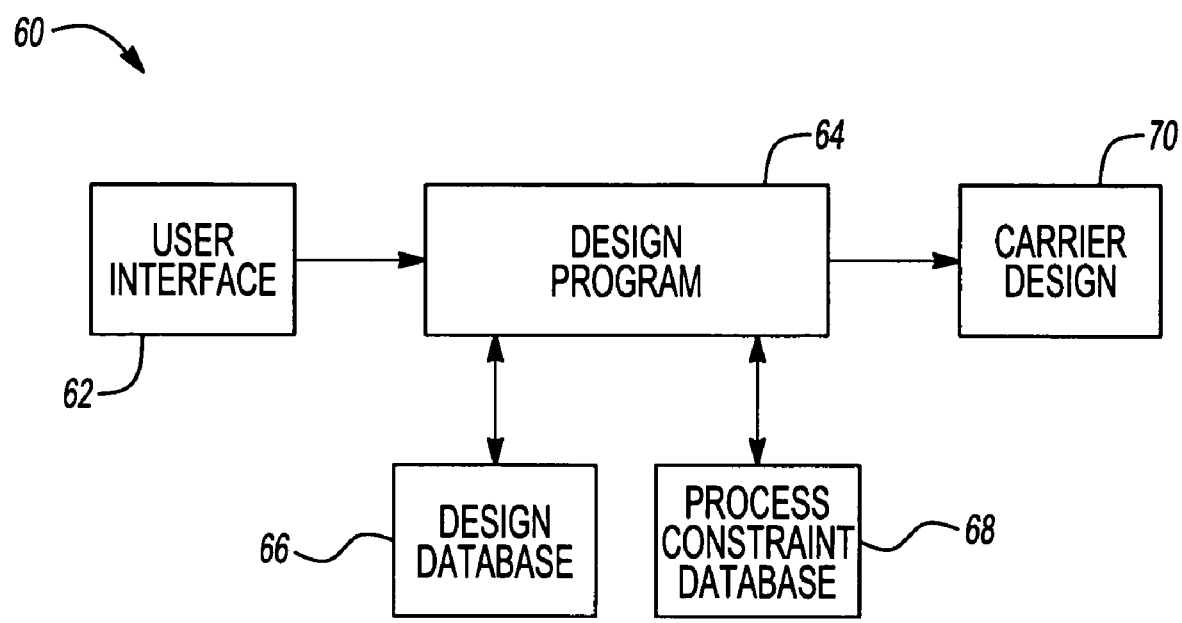
FIG. 3 is a functional block diagram of a carrier design system according to the present invention.

Referring now to FIG. 3, a vehicle chassis carrier design system 60 includes a user interface 62, a design program 64, a design database 66, a process constraint database 68, and a carrier design 70. A user enters vehicle parameters at the user interface 62. For example, vehicle parameters may include, but are not limited to: weight and center of gravity of the vehicle; overall length, height, and width of the vehicle; lengths of the engine hood, doors, and trunk; and wheel and tire dimensions. The vehicle parameters affect the geometry of the vehicle chassis carrier that will be designed by the design program 64. The design program 64 receives the vehicle parameters and determines the geometry of the vehicle chassis carrier according to certain carrier parameters. For example, carrier parameters may include, but are not limited to: width and depth of the posts and bars; height of the posts; and a minimum clearance between the carrier and the vehicle chassis. The design program 64 optimizes the geometry of the vehicle chassis carrier with respect to weight, stability of the carrier on the conveyor, structural strength, and fabricating cost.

The design program 64 communicates with the design database 66 and the process constraint database 68. The design database 66 includes design data for two-and-four-post vehicle chassis carriers and for a particular vehicle. For example, the design database 66 may include component information for the particular carrier type (two-post or four-post) that is being designed. Additionally, the design database 66 may include component information for the particular vehicle chassis that the carrier is being designed for. As the design program 64 receives the vehicle parameters, the design program communicates with the process constraint database 68 to ensure that the vehicle parameters are acceptable. In other words, the design program 64 verifies that the vehicle parameters, as entered, are physically able to be implemented. The process constraint database 68 includes constraints that coordinate the vehicle parameters with the carrier parameters. For example, ensuring that opening and closing of the vehicle doors, hood, and trunk is one such constraint. Another possible constraint is a clearance between the carrier and the vehicle chassis. Still another possible constraint is the structural strength required to support the weight of the vehicle chassis.

The design program 64 updates a carrier design 70 according to the vehicle parameters, carrier parameters, and process constraints. The design program 66 optimizes the carrier design 70 according to an internal optimization algorithm. The algorithm may be customized according to preferences of the user. An exemplary algorithm optimizes the carrier design 70 according to a cost S to build the carrier and a volume V of the carrier wherein $S=S(V)$ and $V=V(h_l, w_l, t_l, t_b; \sigma_{e,max})$, and wherein $h_l$ is the height of the lower bar, $w_l$ is the width of the lower bar, $t_l$ is the wall-thickness of the lower bar, posts, girders, and main beam of the carrier, $t_b$ is the thickness of brackets used to connect the various components of the carrier, i designates the quantity of each component, and $\sigma_{e,max}$ is the maximum equivalent stress found in the carrier after loading and boundary constraints are applied. If it is assumed that the cost of fabricating a carrier is proportional to the volume of the carrier, minimizing the cost is in essence equivalent to minimizing the volume of the carrier. Therefore, the algorithm optimizes the carrier by designing a minimized-volume carrier as follows:

$$\min_{h_i, w_i, t_i, t_b} V(h_i, w_i, t_i, t_b; \sigma_{e,max})$$

subject to the constraints of $h_i > 0$, $w_i > 0$, $t_i \geq 0$ $t_b \geq 0$ and $$\sigma_{e,max} < \frac{\sigma_Y}{n},$$

wherein n is a safety factor of the carrier and $\sigma_y$ is the yield stress of the material. In other words, the design program 64 designs a carrier with a minimum amount of material so that the height and width are positive values and the wall thicknesses are non-negative values. Additionally, a maximum equivalent stress found in the carrier is less than the yield stress of the material scaled down by a factor of n.

Numerical methods for solving the above constrained minimization are known in the art. For example, the constrained minimization may be transformed to an ordinary minimization problem without constraints by introducing a penalty function to the objective function V. The penalty function would register a relatively large number if one or more of the constraints are violated. The Polak-Ribiere conjugate gradient method may then be applied to solve the ordinary minimization problem.

Figure 4:
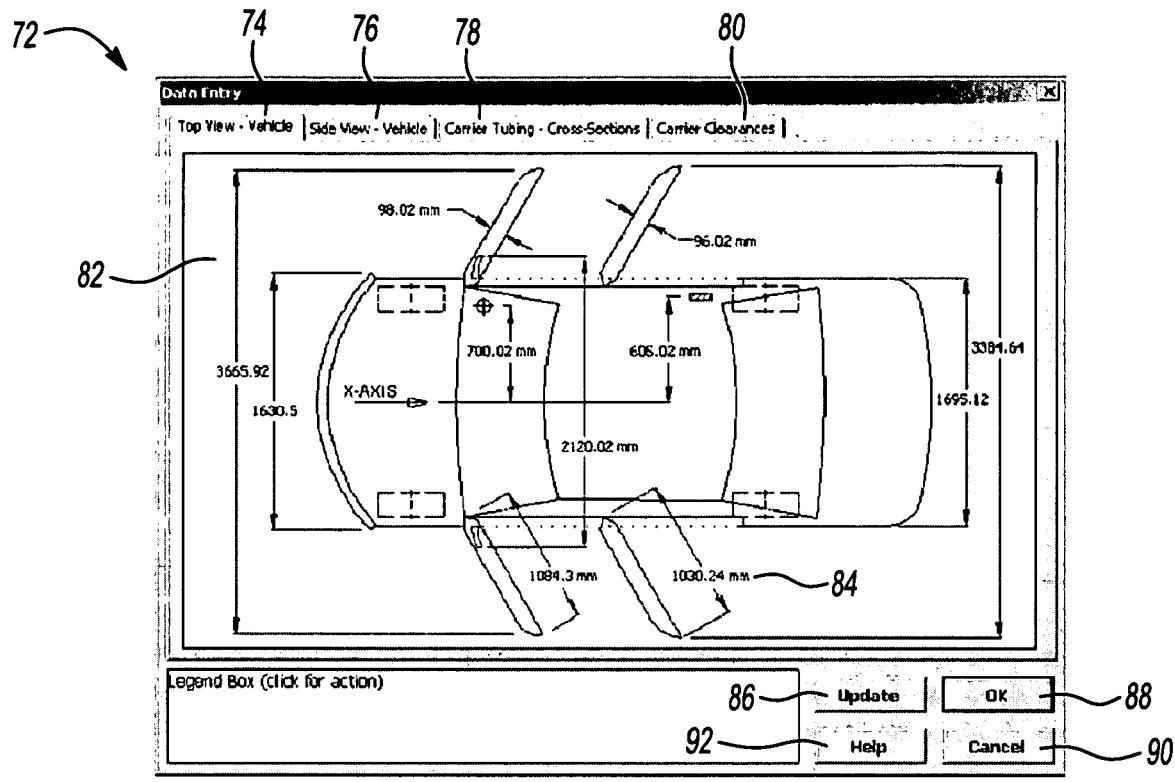
FIG. 4 illustrates an exemplary graphical user interface according to the present invention.

The user interface 62 may be implemented graphically as shown in FIG. 4. The user enters the vehicle chassis parameters at a main data entry window 72. The user may enter different groups of parameters according to geometric location or other commonalities. For example, the main data entry window 72 may include a vehicle top view tab 74, a vehicle side view tab 76, a carrier tubing cross-sections tab 78, and a carrier clearances tab 80. The user selects the vehicle top view tab 74 in order to enter vehicle parameters for a vehicle top view 82. Similarly, the user selects the vehicle side view tab 76 in order to enter vehicle parameters for a vehicle side view (not shown). The user selects the carrier tubing cross-sections tab 78 in order to define cross-sections for the posts and beams of the carriers. The user selects the carrier clearances tab 80 to define minimum clearances between the carrier and various objects, such as barriers in an automotive plant. If the user wishes to edit a particular vehicle parameter, the user selects a vehicle parameter from one or more of the tabs. For example, to edit a vehicle parameter pertaining to vehicle doors, the user selects a door length vehicle parameter 84. The main data entry window 72 also includes various buttons such as an update button 86, an okay button 88, a cancel button 90, and a help button 92.

Figure 5:
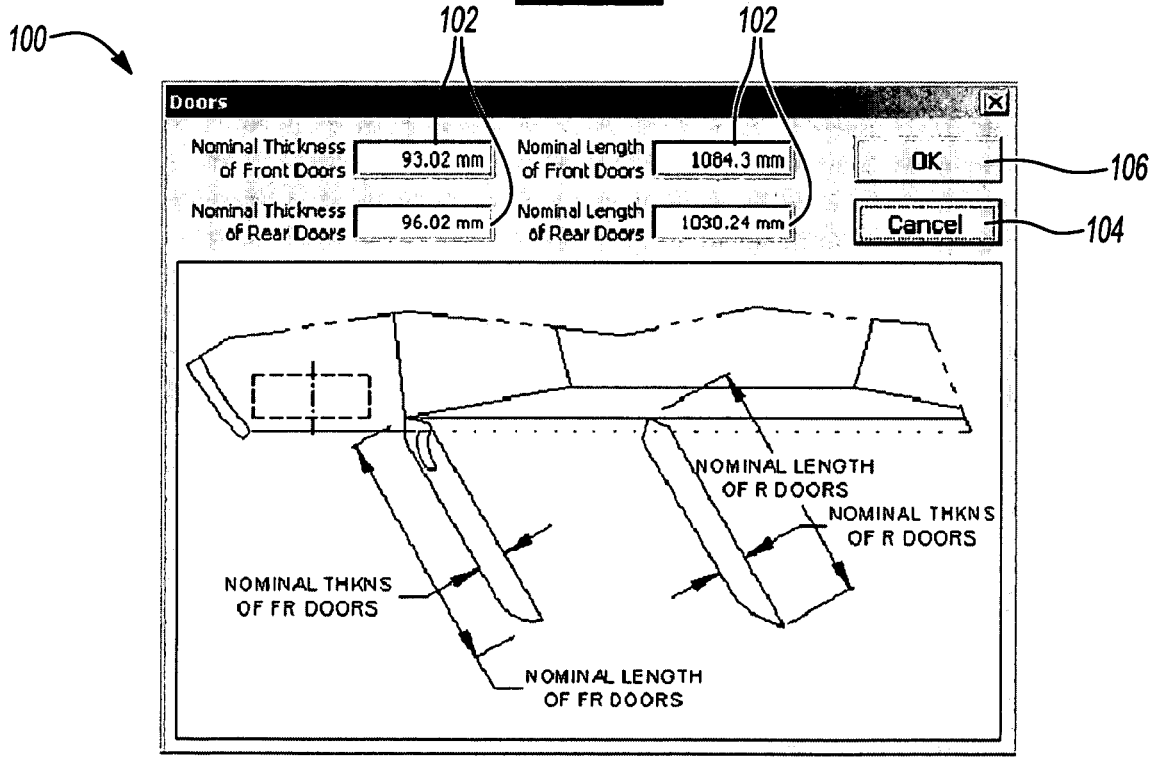
FIG. 5 illustrates an exemplary data entry window according to the present invention.

Selecting a specific vehicle parameter opens a new data entry window for particular vehicle parameters. For example, selecting any of the door vehicle parameters opens a door data entry window 100 as shown in FIG. 5. The user edits the door vehicle parameters by changing values in the door parameter fields 102. The user may undo any changes by selecting a cancel button 104, or accept any changes by selecting an okay button 106. Selecting either the cancel button 104 or the okay button 106 returns to the main data entry window 72.

Referring again to FIG. 4, the user may select the okay button 88 to update any changes to vehicle parameters in temporary memory and close the main data entry window 72. The user may select the update button 86 to accept any changes made to vehicle parameters in the data entry windows. The user may select the cancel button 90 to undo any changes made in the data entry windows. The user may select the help button 92 to obtain information about changing and/or updating the vehicle parameters to modify the carrier design 70.

Referring again to FIG. 3, the design program 64 detects any changes made to vehicle parameters in the user interface 62. The design program 64 updates the carrier design 70 according to the detected changes to the vehicle parameters. Additionally, the design program 64 verifies that the vehicle parameters entered in the user interface 62 satisfy the constraints in the process constraint database 68. If a particular vehicle parameter does not satisfy a constraint, the design program 64 may prompt the user through the user interface 62 that the vehicle parameter must be changed. After the user changes the vehicle parameter, the design program 64 again attempts to verify that the vehicle parameters satisfy all process constraints.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for designing vehicle chassis carriers comprising:
    a user interface that receives vehicle parameter data;
    a database of chassis carrier design data, vehicle design data, and design constraints;
    a chassis carrier design program that communicates with the user interface and the database and generates a chassis carrier design according to the vehicle parameter data, the chassis carrier design data, the vehicle design data, and the design constraints, and transmits the chassis carrier design to a user via the user interface.

2. The system according to claim 1 wherein the user interface includes a first vehicle parameter entry window.

3. The system according to claim 2 wherein the first vehicle parameter entry window includes a graphical representation of a vehicle chassis.

4. The system according to claim 3 wherein the first vehicle parameter entry window includes one or more vehicle parameter fields associated with the graphical representation.

5. The system according to claim 4 wherein the vehicle parameter data is input at the vehicle parameter fields.

6. The system according to claim 1 wherein the vehicle parameter data includes at least one of vehicle dimensions, vehicle component dimensions, a vehicle weight, and a vehicle center of gravity.

7. The system according to claim 1 wherein the chassis carrier design data includes at least one of a carrier type and carrier components.

8. The system according to claim 1 wherein the vehicle design data includes at least one of a vehicle type and vehicle components.

9. The system according to claim 1 wherein the design constraints include at least one of vehicle chassis carrier clearances and a minimum structure strength.

10. The system according to claim 1 wherein the design program prompts a user if the vehicle parameter data is not consistent with the design constraints.

11. A method for generating a design for a vehicle chassis carrier comprising:
  defining process constraints for the vehicle chassis carrier;
  receiving vehicle parameter data; and
  generating a chassis carrier design according to the vehicle parameter data and the process constraints, and transmitting the chassis carrier design to a user.

12. The method according to claim 11 wherein the process constraints include at least one of vehicle chassis carrier clearances and a minimum structure strength.

13. The method according to claim 11 wherein the vehicle parameter data includes at least one of vehicle dimensions, vehicle component dimensions, a vehicle weight, and a vehicle center of gravity.

14. The method according to claim 11 further comprising prompting a user if the vehicle parameter data is not consistent with the process constraints.

15. The method according to claim 11 wherein generating a chassis carrier design further comprises optimizing the chassis carrier design according to a cost to manufacture the vehicle chassis carrier and a volume of the vehicle chassis carrier.

* * * * *